A. P. TEETER.
REVOLVING HARROW.
APPLICATION FILED JAN. 12, 1911.
1,020,854.
Patented Mar. 19, 1912.
2 SHEETS—SHEET 2.
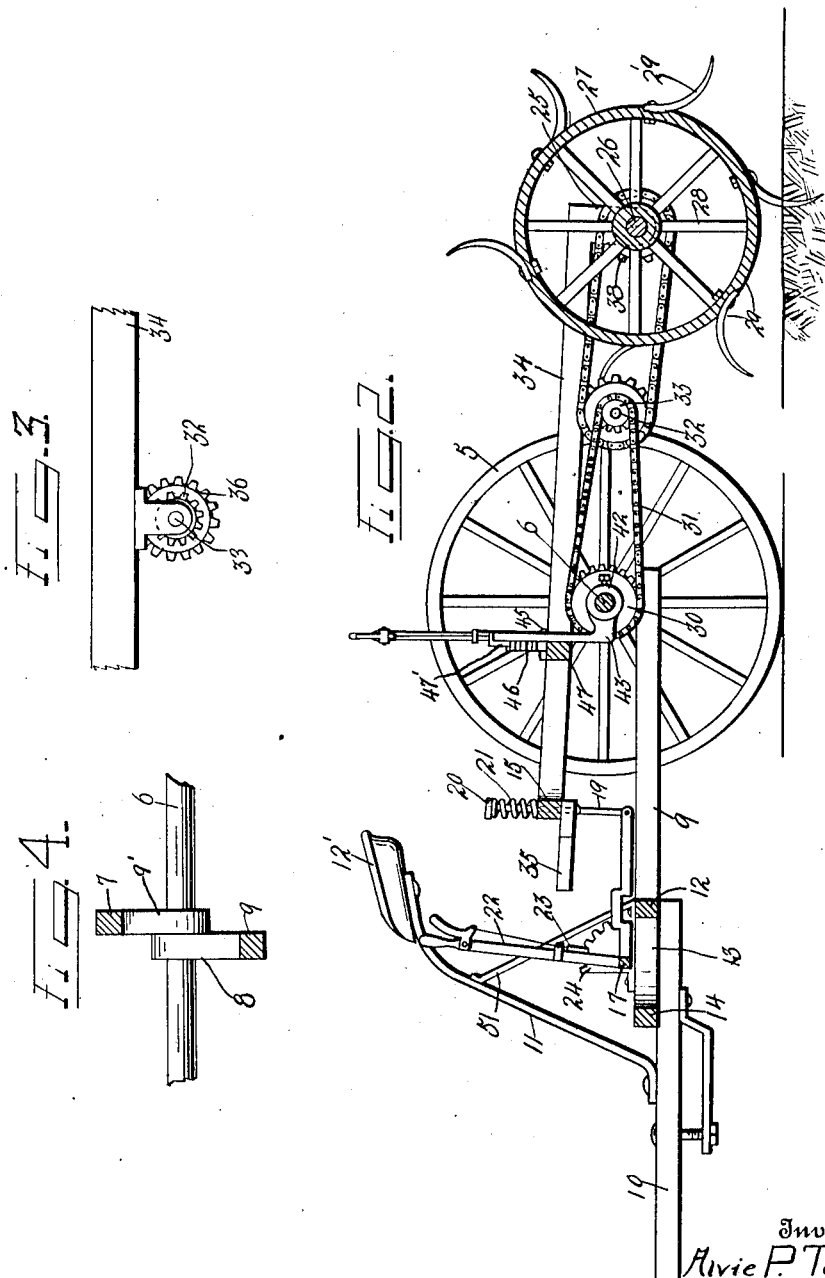
Witnesses
J. E. Strokl.
Ernest F. Riley
Inventor
Alvie P. Teeter.
By
Attorneys

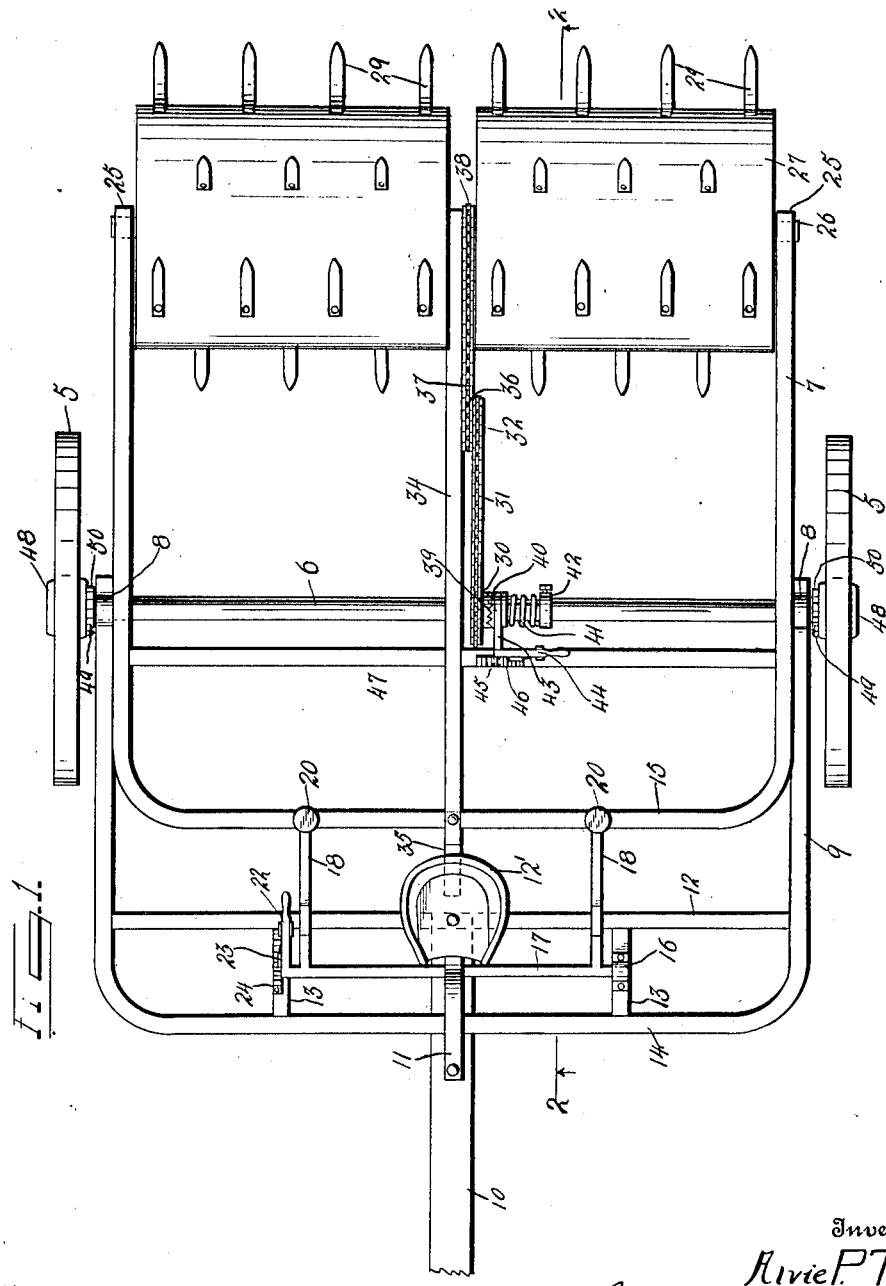

UNITED STATES PATENT OFFICE.

ALVIE P. TEETER, OF BERNE, INDIANA.

REVOLVING HARROW.

1,020,854.  Specification of Letters Patent.  Patented Mar. 19, 1912.

Application filed January 12, 1911. Serial No. 602,250.

*To all whom it may concern:*

Be it known that I, ALVIE P. TEETER, a citizen of the United States, residing at Berne, in the county of Adams, State of Indiana, have invented certain new and useful Improvements in Revolving Harrows; and I do hereby declare the following to be a full, clear, and exact description of the invention, such as will enable others skilled in the art to which it appertains to make and use the same.

This invention relates to improvements in rotary harrows and the leading object of the invention is to provide a harrow comprising a wheeled frame and a supplemental frame mounted on the wheeled frame for vertical swinging movement and carrying at one end a rotary harrow geared to the drive shaft, the supplemental swinging frame being controlled by a special tilting device whereby the harrow may be brought into operative position or moved out of an operative position with respect to the ground.

With the above and other objects in view the invention consists in certain constructions, combinations and arrangements of parts, clearly described in the following specification and clearly illustrated in the accompanying drawings, in which:—

Figure 1 is a top plan view. Fig. 2 is a longitudinal sectional view taken on the line 2—2 of Fig. 1. Fig. 3 is a detail view showing the speed gears for the harrow transmission mechanism. Fig. 4 is a detail sectional view showing two of the bearings of the upper and lower frames.

Referring to the accompanying drawings, 5 denotes the traction wheels which are mounted on the axle 6 which extends through the depending bearings of the upper frame 7, which is preferably formed U-shaped and the vertical bearings 8 of the lower frame 9 which is also formed U-shaped. The forward end of the lower frame 9 is connected to a draft pole 10 which carries a seat post 11 having a seat 12' thereon, which extends to a suitable elevation above the plane of the upper frame 7. A cross bar 12 is secured between the forward portions of the sides of the frame 9 and longitudinally disposed connecting bars or members 13 connect the cross bar 12 with the forward end member 14 of said frame 9. The forward end 15 of the frame 7 is disposed rearwardly of the forward end 14 of the frame 9. The longitudinally disposed connecting bars 13 are provided with bearings 16 in which the ends of the rocking shaft 17 are journaled. The rock shaft 17 has connected thereto rearwardly extending arms 18, the rear ends of which are pivotally connected to the lower ends of the vertically disposed rods 19, which extend through the forward end 15 of the frame 7 and which are provided with heads 20 on their upper ends. Between the heads 20 and the forward end 15 expansion springs 21 are located, which serve to hold the heads 20 normally above the frame 7 to limit their upward movement. The rock shaft 17 carries a throw lever 22 which is provided with a pawl 23 adapted to engage the segmental rack 24 mounted on one of the connecting bars 13. By imparting a rearward movement to the throw lever 22 the heads 20 of the rods 19 will be moved toward the forward end 15 of the frame 7 so as to elevate the rearward end of said frame 7.

The rearward end of the frame 7 is provided with depending bearings 25 in which the ends of the harrow shaft 26 are journaled. The harrow shaft 26 carries a drum 27 which is connected thereto by means of the spokes 28, and said drum carries a series of radially and longitudinally spaced curved harrow teeth 29 which are adapted to engage the ground and break up soil.

The axle 6 carries a gear wheel 30 over which a chain 31 is trained, said chain being also trained over a small gear wheel 32, which is mounted on a small shaft 33 secured to one side of the longitudinally extending central bar 34 carried by the frame 7, the forward end of said bar 34 being provided with a weight 35 to counterbalance the drum 27 and the teeth carried thereby. The shaft 33 carries a gear wheel 36 over which a chain 37 is trained, said chain 37 being also trained over a gear wheel 38, which is mounted on the harrow shaft 26 between the sections of the drum 27. The gear wheel 30 carries a clutch element 39 with which a clutch element 40, splined to the axle 9, is adapted to engage. The clutch element 40 is normally held in engagement with the clutch 39 by means of a spring 41 which is mounted on the axle 6 and which bears against a set collar 42 carried by said axle. The clutch element 40 is engaged by a spanner arm 43 carried by a lever 44 which is pivoted at 45 to the segmental rack 46 mounted on the cross bar 47 secured to the sides of the frame 7. The lever 44 carries a pawl 47' which is adapted to engage the teeth of the segment 46, whereby the spanner arm 43 can be held in various positions so as to hold the clutch element 40 out of engagement with the clutch element 39. The hub 48 of each wheel 5 carries a pair of pawls 49 which are adapted to engage the ratchet wheels 50 mounted on the axle 6, the teeth of the ratchet wheels 50 being so arranged that the wheels 5 will be locked to the axle 6 when the harrow is driven forwardly while said wheels will rotate freely on the axle 6 when the harrow is driven rearwardly. The seat post 11 is suitably braced to the frame 9 by means of a brace 51.

I claim:—

1. In an agricultural implement, a lower U-shaped frame, a tongue secured to the closed end of the frame and extending forwardly thereof, a brace between the sides of the frame to which the rear end of the tongue is secured, an axle journaled in bearings extending upwardly from the rear ends of the frame, wheels on the ends of the axle to rotate therewith, an upper U-shaped frame similar to the aforesaid frame and having depending bearings rearwardly of its brace member and pivoted to the axle, an implement carried by depending rear ends of the upper frame, means carried upon the brace member of the upper frame for controlling the operation of the implement, connecting members between the front portion and cross bar on the lower frame and disposed upon opposite sides of the tongue, a rock shaft journaled at its ends upon said connecting members and having rearwardly extended arms adjacent its ends, rods pivotally connected with the rear ends of the arms and disposed vertically through the forward end of the upper frame, springs mounted upon the rods between the frame and upper ends of the rods and resiliently supporting the upper frame and an adjustable throw lever at one end of the rock shaft for shifting the arms and upper frame upon its pivots.

2. In a harrow, a lower frame disposed in a horizontal position, a draft member connected to the forward portion of the frame, a seat supported centrally of the said portion of the frame, an axle rotatably journaled in bearings extending upwardly from the rear end of the frame, wheels mounted on the ends of the axle to impart rotation thereto in one direction, an upper frame having depending bearings rearwardly of its forward portion and pivotally engaged with the axle inwardly of the adjacent bearings of the lower frame, a rotatable harrow member journaled in the rear end of the upper frame, a central longitudinal bar carried by the upper frame and rotatably receiving the harrow member at its rear end, the forward end of the bar being weighted to counterbalance the weight of said member, driven connections between the axle and the harrow member for rotating the latter, means carried by the upper frame for controlling the operation of the driven connections, a shaft pivotally supported transversely of the forward portion of the lower frame, an integral vertical lever formed at one end of the shaft, arms formed adjacent the ends of the shaft and projecting rearwardly, vertical rods pivoted to the rear ends of the arms and engaged through the forward portion of the upper frame, means carried by the rods to cushion movement of the upper frame at its forward portion and means coacting with the lever to hold it in an adjusted position when shifted to raise or lower the harrow member.

In testimony whereof, I affix my signature, in presence of two witnesses.

ALVIE P. TEETER.

Witnesses:
R. B. KIN,
J. F. TEETER.

---

Copies of this patent may be obtained for five cents each, by addressing the "Commissioner of Patents, Washington, D. C."